United States Patent
Owades

(10) Patent No.: US 7,175,864 B1
(45) Date of Patent: Feb. 13, 2007

(54) PROCESS FOR PRODUCING A MALT BEVERAGE HAVING IMPROVED FOAMING PROPERTIES AND PRODUCT PRODUCED THEREFROM

(76) Inventor: Joseph L. Owades, 3097 Wood Valley Rd., Sonoma, CA (US) 95476

( * ) Notice: Subject to any disclaimer, the term of this patent is extended or adjusted under 35 U.S.C. 154(b) by 0 days.

(21) Appl. No.: 10/784,020

(22) Filed: Feb. 19, 2004

(51) Int. Cl.
C12C 7/00 (2006.01)
C12C 11/00 (2006.01)
C12C 5/02 (2006.01)

(52) U.S. Cl. .......................... 426/11; 426/29; 426/592

(58) Field of Classification Search ................ 426/592, 426/11, 29
See application file for complete search history.

(56) References Cited

U.S. PATENT DOCUMENTS 6,387,883 B1   5/2002   Abbruzzese et al. .......... 514/21

2002/0102345 A1 *   8/2002   Ramirez .................... 426/590

FOREIGN PATENT DOCUMENTS

| FR | 002659980 | * | 9/1991 |
| JP | 10-179113 | * | 7/1998 |
| JP | 10-179118 | * | 7/1998 |
| JP | 10-179121 | * | 7/1998 |
| JP | 02000166533 A | * | 6/2000 |

OTHER PUBLICATIONS www.redbull.com/extras/ingredients.jsp.*

* cited by examiner

Primary Examiner—Milton I. Cano
Assistant Examiner—Adepeju Pearse
(74) Attorney, Agent, or Firm—Hayes Soloway P.C.

(57) ABSTRACT

A brewed malt beverage having improved foaming properties due to the addition of caffeine.

15 Claims, No Drawings

PROCESS FOR PRODUCING A MALT BEVERAGE HAVING IMPROVED FOAMING PROPERTIES AND PRODUCT PRODUCED THEREFROM

FIELD OF THE INVENTION

The present invention relates generally to the production of beer, and more particularly to the production of beer having improved foaming properties. The invention has particular utility in the production of beer and will be described in connection with such utility, although the invention also may be advantageously used in the production of other malt beverages.

DESCRIPTION OF THE INVENTION

In the production of beer, yeast is used to ferment a substrate made of a mixture of fermentable carbohydrates, "wort carbohydrates" into ethyl alcohol. The wort carbohydrates which can be fermented by Brewers' yeast are normally maltose, glucose, maltotroise and traces of sucrose and fructose. They are obtained by allowing malt enzymes to transform starch molecules from malt and other adjuncts into the fermentable sugars outlined above. This is done during the mashing operation.

Conventional mashing involves mixing together of malt and cereal adjuncts in hot water, followed by a series of heating and resting cycles. Substances which are solubilized in the hot water are collectively called the extract. Following mashing, the soluble materials are extracted in a lauter tub and sparged with hot water, leaving behind the spent grain. A clear liquid (wort) obtained by the extraction may then be transferred to a brew kettle and boiled for a period of time which inactivates the malt enzymes. Wort compositions vary depending on the raw materials and mash cycle employed.

A typical wort used in brewing may comprise the mixed extract of a barley malt mash and a cereal adjuncts mash typically of corn grits or rice. Such mixed extract may be obtained by treating a kiln dried barky malt with warm water, at about 50° C., in one vessel, the mash tub, and boiling the cereal adjuncts, (e.g. corn grits or rice) in another vessel, the so-called "cooker," and then adding the boiling contents of the cooker to the warm water suspension in the mash tub. This serves to raise the temperature of the mash tub contents to about 57–67° C. During the rise from 50° C., to about 67° C., and starting at around 63° C., the enzymes in the malt and in particular beta-amylase which is most active between 60° C. and 70° C., partially degrade the starches in both the malt itself and in the corn grits or rice to form simple fermentation sugars, primarily glucose, fructose and maltose. These simple sugars are fairly sweet tasting, and also are fermentable by Brewers' yeast to alcohol and carbon dioxide.

The combined mash is then filtered in a lauter tub, mash filter or other means and the resulting wort boiled with hops, filtered, cooled and fermented with yeast after a period of rest, where beer is stored cold and the yeast is allowed to settle out, the beer filtered, once or twice, and then carbonated.

Carbonated malt beverages produce a more or less long-lasting foam when poured into a drinking glass. This foam has always been considered a desirable attribute in such beverages. Carbonating enhances the flavor and mouth feel and adds to the consumer's perception of freshness. A flat beer looks and tastes stale. Prior to the present invention, the only agents known to improve the foaming properties have been gums such as acacia or alginate, or a metal salt, such as ferrous ammonium sulfate, or ginseng. However, such agents may adversely affect taste and/or increase turbidity of the resulting beverage product and thus are not entirely satisfactory.

OBJECT OF THE INVENTION

It is thus a primary object of the present invention to provide a new and improved process for improving the foaming properties of a beverage. Another object of the present invention is to provide a novel and improved method for increasing the foam life of a malt beverage. A specific object of the present invention is to provide a beverage which is characterized by improved foaming characteristics.

BRIEF SUMMARY OF THE INVENTION

Generally, in accordance with the present invention, I have found that the addition of caffeine to a malt beverage, e.g., beer or ale, during the normal brewing processes produces a finished beverage of improved foaming properties.

DETAILED DESCRIPTION OF THE INVENTION

Caffeine is a naturally occurring alkaloid that is found in coffee beans, tea leaves, cocoa beans, mate leaves, guarana beans and kola nuts. Caffeine, which is chemically 1, 3, 7-tri-methylxanthine, has the formula:

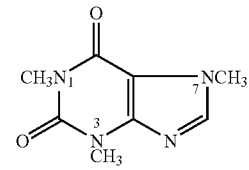

is odorless, and has a bitter taste, is slightly soluble in water and in alcohol, which makes it quite compatible as an addition to beer. Caffeine is available commercially as a by-product of decaffeinized coffee manufacture.

Caffeine has several pharmacological actions. It has a stimulating action on the central nervous system. It has important actions on the cardiovascular system. It has some importance in relaxing smooth muscle and in increasing diuresis.

It has now been found that the addition of caffeine during the normal brewing process produces a beer with improved foaming properties, without effecting flavor.

The caffeine may be added at any stage of the brewing process. It may be added to the mashing cycle before the kettle. It may be added to the kettle and boiled with hops. It may also be added during the fermentation or aging stage, and since it is readily soluble in water it may be added in the finishing stage. The foaming improvement appears to be dependent on the quantity of caffeine added wherever it is used. Preferably, the caffeine may be added in an amount within the range of 10 milligrams to 300 milligrams per 12 ounces of finished beverage, more preferably 20 to 100 milligrams per 12 ounces of finished beverage may be used also. The foaming improvement appears to be contingent on the quantity of caffeine added. The reason for the improvement of foaming by the addition of the caffeine during the brewing process is not understood. In other beverages, be they coffee, tea or cola drinks, improvement of foaming has not been observed.

These quantities of caffeine also may be expressed as 35.5 parts per million to 1000 parts per million by weight of the finished beverage, preferably 71 to 355 ppm by weight of caffeine.

Addition of more than about 300 milligrams per 12 ounces of finished beverage (1000 ppm) appears to add little additional improvement of foaming.

The present invention will be further described in the following working examples.

The following examples, illustrative of the present invention, employ a conventional brew house having a mash tub and cereal cooker or boiler vessel. The basic procedure was to suspend dried, ground barley malt in water, heat the resulting suspension to about 50° C. for a period of time.

In Example I, the cereal adjuncts, i.e. corn grits, which have been boiled in a separate cereal cooker or boiler vessel, are added to the malt slurry. The combined mash is heated for a period of time and then transferred to a filtering vessel or lauter tub. The clear liquid which drains from the mash, and the hot water used to wash the adhering liquid from the grains are run into a kettle and boiled. The hops and caffeine are added during the boiling period. The liquid is again strained, cooled and treated with yeast and fermented. In Example II the barley malt is ground in the mill and mashed with water at about 51° C. The temperature is raised and the malt slurry is transferred to a mash filter. The filtered liquid is run into a kettle, and cereal adjuncts in the form of corn syrup added. The combined mash is heated for a period of time and then transferred to a filtering vessel or lauter tub where the liquid is strained, cooled and allowed to ferment. The fermented liquid is filtered, and treated with a hot water solution of caffeine.

EXAMPLE I 3,000 lbs. of corn grits were added to 60 barrels of water, and the resulting mixture heated to boiling, with stirring, for 30 minutes in a cereal cooker.

Concurrently, 5,000 lbs. of ground barley malt were added to 60 bbls. of water, and heated to 50° C., with stirring, in a mash tub. The resulting malt mash was held at 50° C. for 15 minutes, and the contents of the cereal cooker were then rapidly pumped over into the mash tub. The combined mash was held at 63° C. for 30 minutes, and then heated to 75° C. and transferred to a lauter tub. A clear liquid, drained from the mash and hot water used to wash the adhering liquid from the grains are run into a kettle and boiled for 90 minutes. Sixty lbs. of hops and 6.0 lbs. of caffeine are added during the boiling period.

The resulting liquid is again strained, cooled to about 9° C., and transferred to a fermentation tank to which was added one hundred lbs. of brewers' yeast. The resulting mixture was allowed to ferment for seven days. After letting the yeast settle out, and filtering, the resulting filtrate beer was bottled.

In a time and pour test, the caffeine-treated beer foam lasted 5 minutes, while beer produced under identical conditions, but without the addition of caffeine, the foam lasted only 3 minutes.

EXAMPLE II 2,500 lbs. of ground barley malt were added to 30 bbls. of water, and heated to 51° C. The temperature of the mash was raised to 75° C., and the mash transferred to a mash filter. The filtered liquid was run into a kettle and 140 gallons of corn syrup added. The resulting combined mash was then boiled for 60 minutes. The resulting liquid was strained, cooled to about 11° C., and transferred to a fermentation tank to which was added 90 lbs. of brewers' yeast. The resulting mixture was allowed to ferment for seven days. The fermented liquid was then filtered, and treated with a hot water solution of 10.0 lbs. of caffeine. The treated liquid was held at 1° C. for 24 hours, and the liquid was then filtered, packaged and cooled.

In a pour test, the caffeine-treated malt beverage foam lasted 5½ minutes while malt beverage produced under identical conditions, but without the addition of caffeine, lasted on 3 minutes.

Certain changes may be made without departing from the scope of the invention herein involved. It is therefore intended that all matter contained in the above description shall be interpreted as illustrative and not in a limiting sense.

The invention claimed is:

1. A brewed alcoholic malt beverage to which caffeine is added during the brewing process, wherein the amount of caffeine added is below the threshold to effect flavor, the amount being 35.5 to 1000 parts per million by weight of the finished beverage, the beverage being characterized by improved foaming properties.

2. The beverage according to claim 1, wherein the caffeine is added during boiling.

3. The beverage according to claim 1, wherein the caffeine is added during mashing.

4. The beverage according to claim 1, wherein the caffeine is added following mashing.

5. The beverage according to claim 1, wherein the caffeine is added during finishing.

6. The beverage according to claim 1, wherein the caffeine is added in an amount equal to 10 to 300 milligrams of caffeine per 12 ounces of beverage.

7. The beverage according to claim 6, wherein the caffeine is added in an amount equal to 20 to 100 milligrams of caffeine per 12 ounces of beverage.

8. A method of improving the foaming properties of a brewed alcoholic malt beverage without effecting flavor which comprises adding caffeine to the malt beverage during the brewing process, wherein the amount of caffeine added is 33.5 to 1000 parts per million by weight of the finished beverage.

9. The method according to claim 8, wherein said caffeine is added prior to or following fermentation.

10. The method according to claim 8, wherein the caffeine is added in an amount equal to 10 to 300 milligrams of caffeine per 12 ounces of beverage.

11. The method according to claim 9, wherein the caffeine is added during mashing.

12. The method according to claim 9, wherein the caffeine is added during boiling.

13. The method according to claim 9, wherein the caffeine is added during finishing.

14. The method according to claim 9, wherein the caffeine is added during aging.

15. The method according to claim 10, wherein the caffeine is added in an amount equal to 20 to 100 milligrams of caffeine per 12 ounces of beverage.

* * * * *